(12) United States Patent
Jao

(10) Patent No.: US 6,672,552 B1
(45) Date of Patent: Jan. 6, 2004

(54) SUPPORTING ROD ASSEMBLY PROVIDING LUMINOUS DECORATING EFFECT

(76) Inventor: Chzh-Lin Jao, No. 43-4, Ta Ping Village, San Wan Counrty, Miao Li Country (TW)

( * ) Notice: Subject to any disclaimer, the term of this patent is extended or adjusted under 35 U.S.C. 154(b) by 0 days.

(21) Appl. No.: 10/428,135

(22) Filed: May 2, 2003

(51) Int. Cl.⁷ .................................................. A47H 1/14
(52) U.S. Cl. ...................... 248/251; 248/254; 362/102
(58) Field of Search .............................. 248/201, 251, 248/254, 266, 267; 362/102, 101, 458, 800

(56) References Cited

U.S. PATENT DOCUMENTS

| | | | | |
|---|---|---|---|---|
| 2,520,691 A | * | 8/1950 | Otis | 313/110 |
| 5,450,299 A | * | 9/1995 | Lepre | 362/145 |
| 5,980,063 A | * | 11/1999 | Ford et al. | 362/186 |
| 6,106,129 A | * | 8/2000 | Cranor et al. | 362/34 |
| 6,210,015 B1 | * | 4/2001 | Ross | 362/101 |
| 6,280,051 B1 | * | 8/2001 | Wallach | 362/202 |
| 6,447,138 B1 | * | 9/2002 | Yang | 362/96 |
| 6,464,368 B1 | * | 10/2002 | Chen | 362/96 |
| 6,539,654 B2 | * | 4/2003 | Lin | 40/406 |
| 6,612,712 B2 | * | 9/2003 | Nepil | 362/101 |

* cited by examiner

Primary Examiner—Ramon O. Ramirez
Assistant Examiner—Amy J. Sterling
(74) Attorney, Agent, or Firm—Troxell Law Office PLLC

(57) ABSTRACT

A supporting rod assembly includes a supporting rod made of a transparent plastic material through integral injection molding and having a row of air bubbles formed therein during the injection molding, and at least one receiving head connected to an end of the supporting rod. A light-emitting device having at least one light-emitting diode (LED) is received in the receiving head, such that light emitted from the LED is projected onto the end of the supporting rod to produce gradually changed brightness degrees and color shades along the supporting rod, and thereby creates a luminous decorating effect for an article on which the supporting rod assembly is used. Alternatively, a plurality of light-conducting strips may be embedded in the supporting rod when it is injection-molded. The LED may be conveniently turned on with a vibration-actuated, sound-actuated, or light-actuated switch.

4 Claims, 7 Drawing Sheets

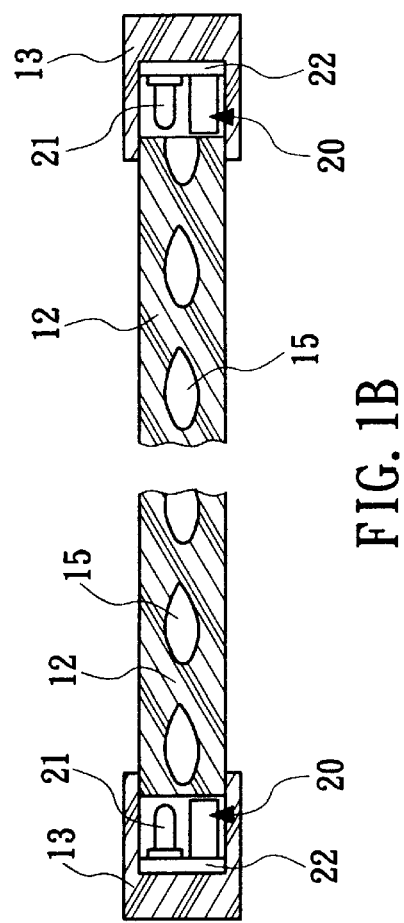
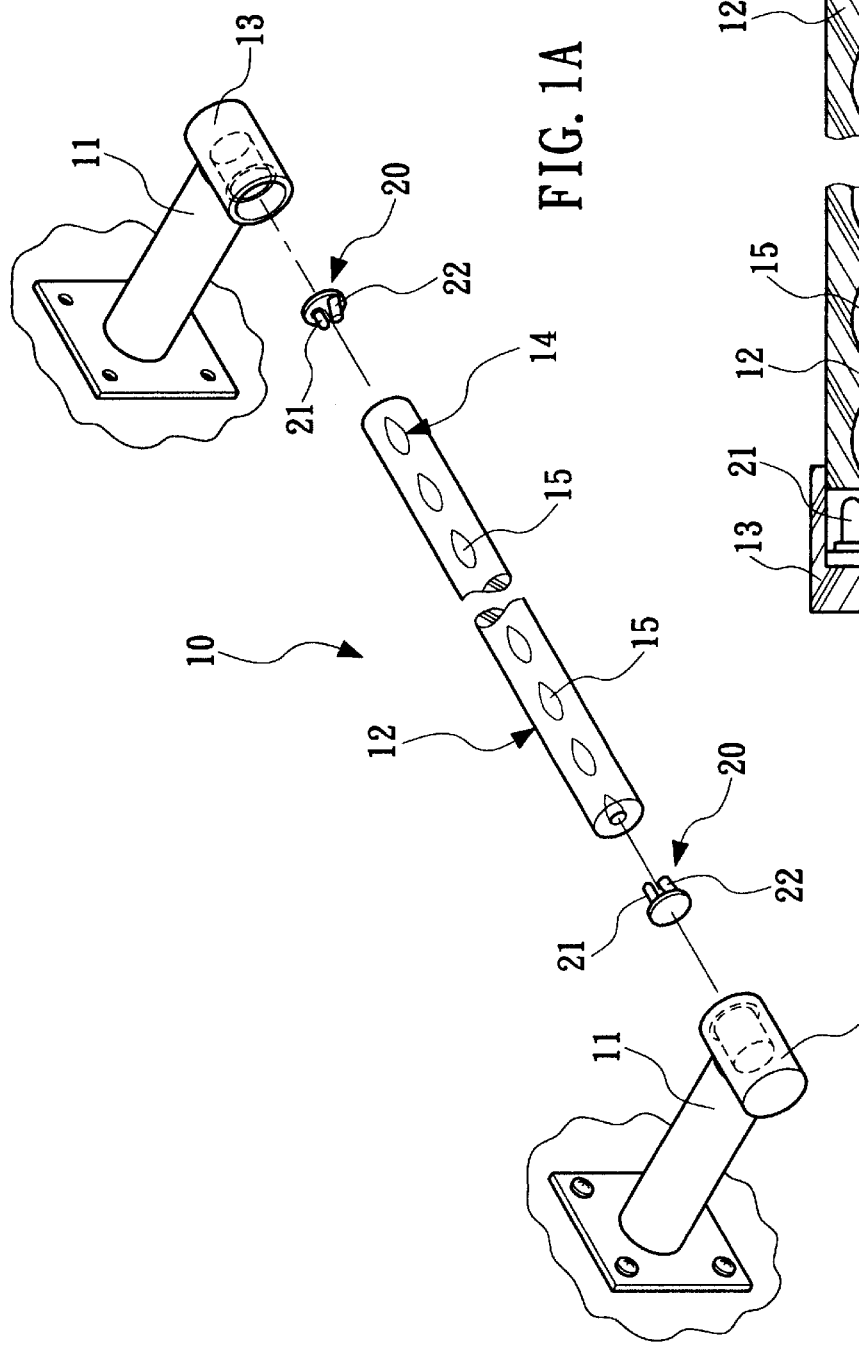
FIG. 1A
FIG. 1B

SUPPORTING ROD ASSEMBLY PROVIDING LUMINOUS DECORATING EFFECT

FIELD OF THE INVENTION

The present invention relates to a supporting rod assembly providing a luminous decorating effect, and more particularly to a transparent plastic supporting rod that internally includes a series of hollow bubbles formed during injection molding of the rod, so that light emitted from light-emitting diodes located at two ends of the rod is projected into the rod via two ends thereof to produce luminous spots or luminous surface on outer surfaces of the bubbles, creating a luminous decorating effect.

BACKGROUND OF THE INVENTION

A lot of articles that frequently appear in people's daily life, such as mirror frame, towel rack, cosmetics shelf, door handle, clock holder, picture frame, etc., are differently designed to increase a novelty or decorating effect thereof. These articles usually include one or more supporting rods. Up to date, there has not been found among these supporting rods any one that provides a luminous decorating effect. In the past, an ornament made of an acrylic material is frequently used to show special luminous effect. To do so, first carve differently contoured figures or patterns on a rear side of the acrylic material to provide a transparent ornament on which three-dimensional figures or patterns may be seen from a front side thereof, and then project light beams onto the acrylic ornament via a bottom surface thereof, so that the light beams are refracted at different carved surfaces on the acrylic ornament to create special luminous effect. Although it is possible to manufacture the above-mentioned supporting rods with the acrylic material to provide sufficient bearing strength, the acrylic supporting rods are not suitable for carving differently contoured figures or patterns due to limited areas thereof. Thus, light projected on the non-carved acrylic supporting rod does not effectively create a luminous decorating effect thereon.

SUMMARY OF THE INVENTION

A primary object of the present invention is to provide a supporting rod assembly providing luminous decorating effect. To achieve the above and other objects, the supporting rod assembly includes a supporting rod and two receiving heads. The supporting rod is made of a transparent plastic material through integral injection molding, and has a row of axially arranged hollow air bubbles formed therein at the time it is injection-molded. The two receiving heads are separately connected to two outer ends of the supporting rod, and at least one of the two receiving heads has a light-emitting device received therein. The light-emitting device includes at least one light-emitting diode (LED), from which light is emitted to project onto the outer end of the supporting rod and thereby produces luminous sports or luminous surfaces on outer surfaces of the hollow air bubbles formed in the supporting rod, creating a luminous decorating effect for the supporting rod assembly.

The supporting rod and the air bubbles of the supporting rod assembly of the present invention may be designed to have different rod diameters and bubble sizes depending on various kinds of articles, such as mirror frame, towel rack, cosmetics shelf, door handle, clock holder, picture frame, etc., on which the supporting rod assembly is used.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein

FIG. 1A is a fragmentary exploded perspective view of the towel rack of FIG. 1;

FIG. 1B is a fragmentary sectioned front view of the towel rack of FIG. 1;

DETAILED DESCRIPTION OF THE PREFERRED EMBODIMENTS

Figure 1:
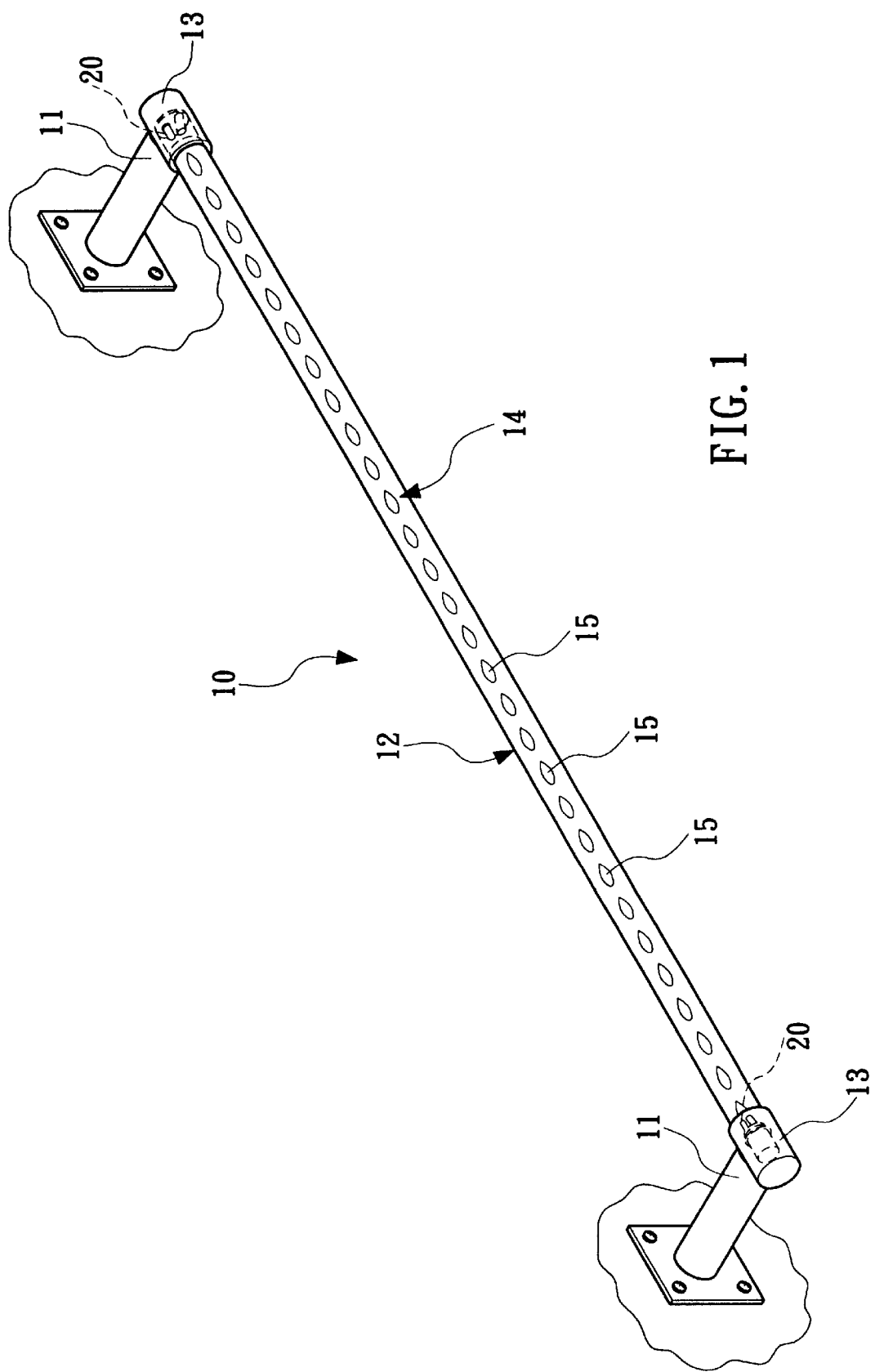
FIG. 1 is a perspective view of a towel rack using the supporting rod assembly of the present invention.
Figure 3:
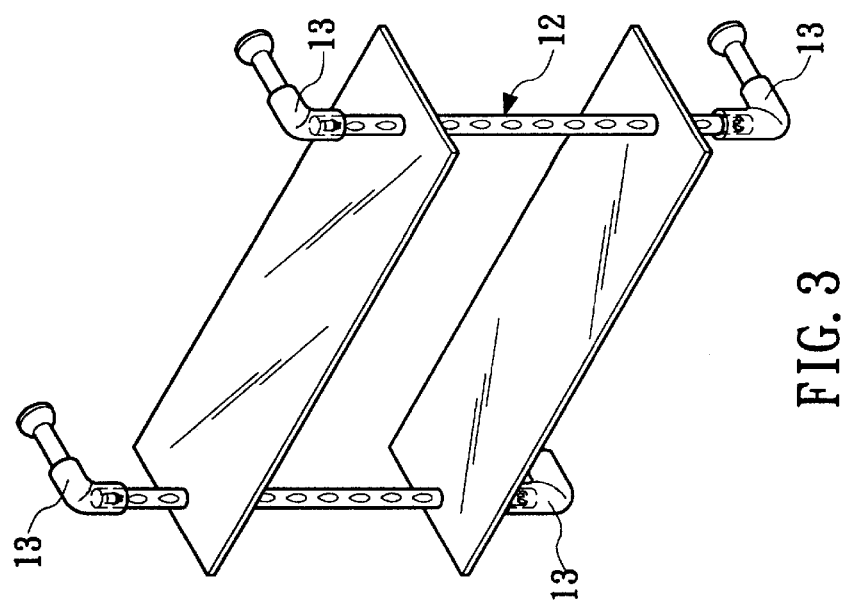
FIG. 3 shows the supporting rod assembly of the present invention is used as a shelf upright.
Figure 2:
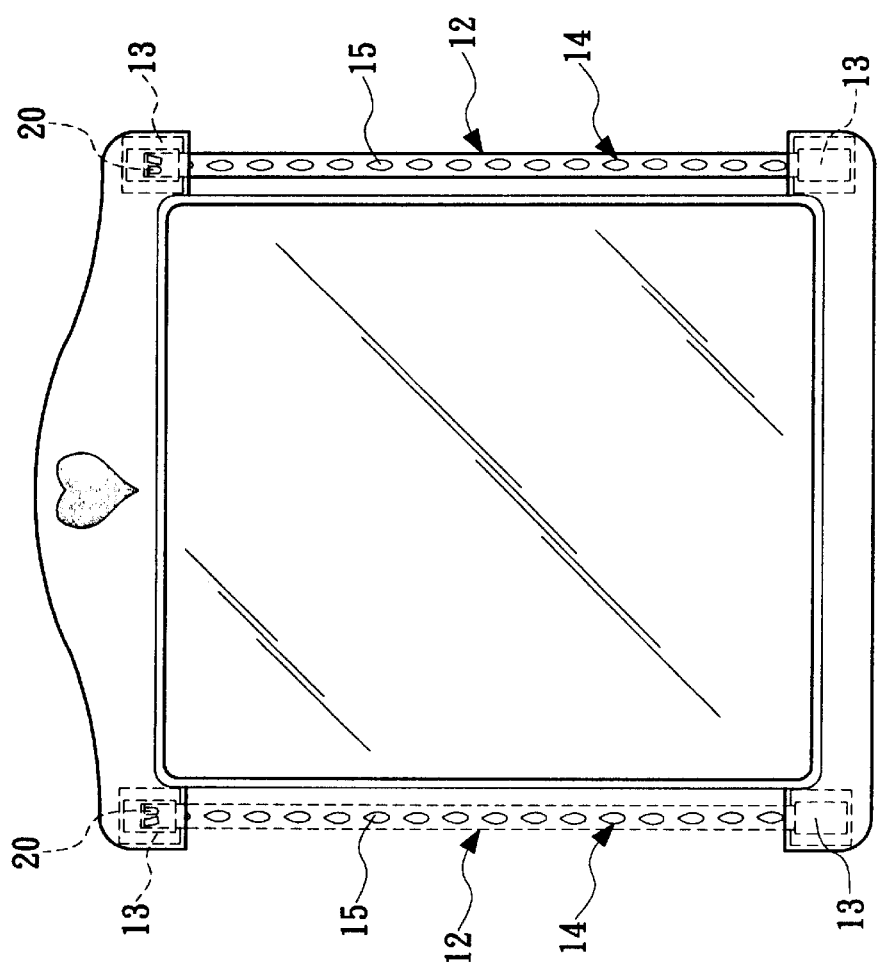
FIG. 2 shows the supporting rod assembly of the present invention is used as part of a mirror frame.
Figure 4:
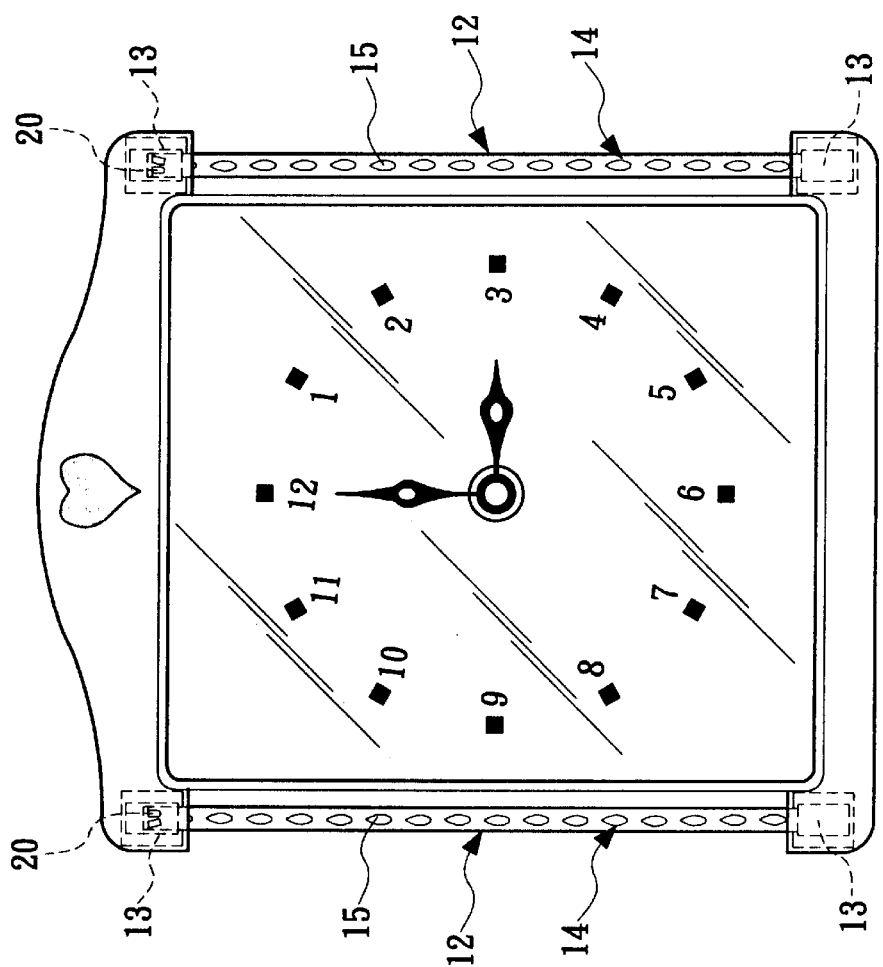
FIG. 4 shows the supporting rod assembly of the present invention is used as part of a clock holder.
Figure 6:
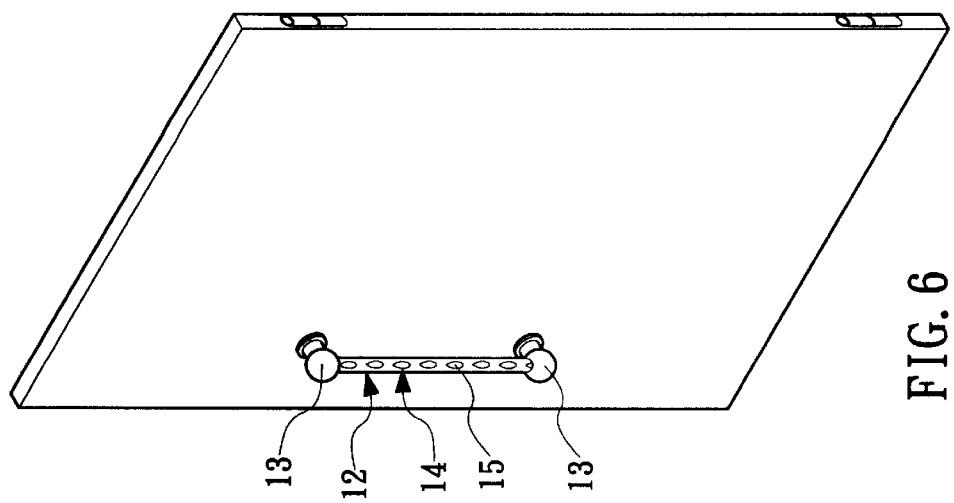
FIG. 6 shows the supporting rod assembly of the present invention is used as a handle.
Figure 5:
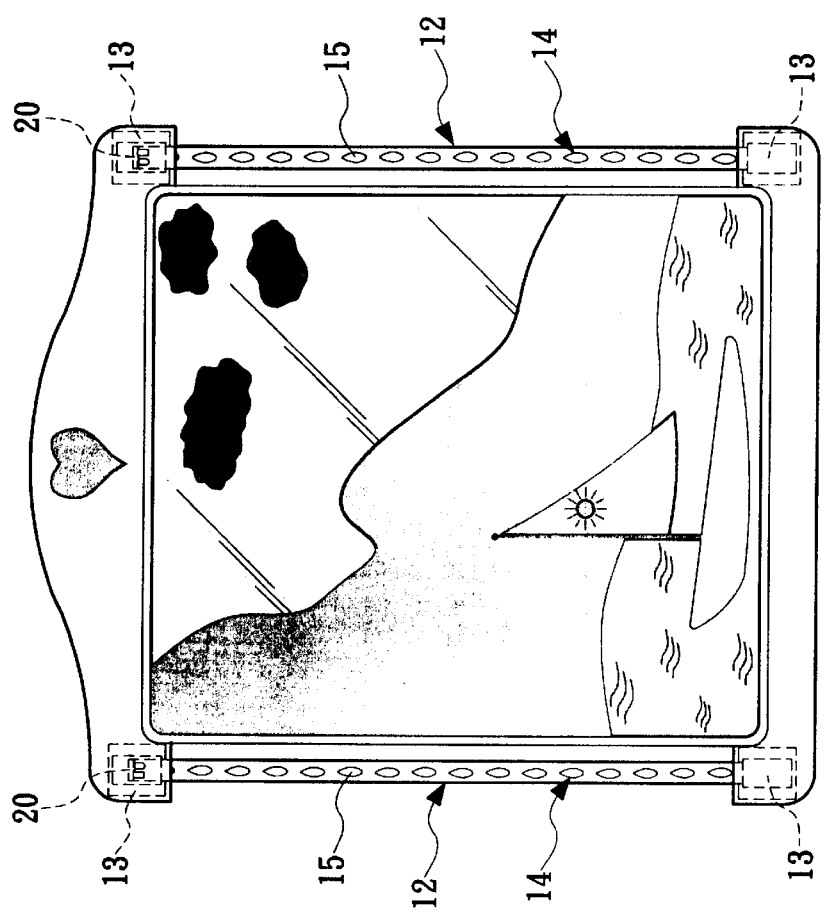
FIG. 5 shows the supporting rod assembly of the present invention is used as part of a picture frame.

The supporting rod assembly of the present invention will now be described with reference to FIGS. 1, 1A, and 1B, in which a towel rack 10 using the present invention is shown. The towel rack 10 mainly includes two mounting arms 11, each of which is provided at a free end with a receiving head 13, and a crossbar 12 extended between the two mounting arms 11 with two outer ends received in the receiving heads 13.

The crossbar 12 is made of a transparent plastic material through integral injection molding and may have a round or any other different cross section. A row 14 of axially arranged air bubbles 15 is formed in the crossbar 12 with the currently available plastic injection-molding technique when the crossbar 12 is injection-molded. A distance between two adjacent air bubbles 15 is controllable in the process of injection molding.

The receiving head 13 at the free end of each mounting arm 11 has an inner space defined therein for receiving an outer end of the crossbar 12 and a light-emitting device 20. The light-emitting device 20 includes at least one light-emitting diode (LED) 21 and an electronic circuits and switch assembly 22. When there are two or more light-emitting diodes 21 in each light-emitting device 20, they may be of different colors and faced toward the outer end of the crossbar 12. A switch included in the electronic circuits and switch assembly 22 may be turned on in one of many different ways. For example, the switch may be a vibration-actuated switch, a sound-actuated switch, or a light-actuated switch, depending on actual needs. The electronic circuits (on a circuit board) may be designed to control the light-emitting diodes 21 for the same to turn off or flash in different manners. Since the light-emitting device 20 with light-emitting diodes is a known skill, it is not discussed in details herein.

When the light-emitting diodes 21 of the two light-emitting devices 20 are turned on, light is emitted to project onto two outer ends of the crossbar 12. Due to a light conducting property of the plastic crossbar 12, the light projected onto the outer ends of the crossbar 12 is transmitted through the crossbar 12 to produce luminous spots or luminous surfaces on the row 14 of air bubbles 15. The closer the air bubble 15 is to the outer end of the crossbar 12, the brighter the luminous spot or luminous surface on the air bubble 15 is. Therefore, the crossbar 12 has variable brightness that gradually reduces from outer sides to a central portion of the crossbar 12. Of course, it is possible to provide the light-emitting device 20 only in one of the two receiving heads 13. Alternatively, two light-emitting devices 20 having differently colored LEDs 21 may be separately provided in the two receiving heads 13 to illuminate the crossbar 12 while produce gradually changed brightness degrees and different color shades along a full length of the crossbar 12.

Positions, sizes, and degrees of structural strength for the crossbar 12, the receiving heads 13, and the light-emitting devices 20 may be differently decided depending on the article on which the supporting rod assembly of the present invention is used. FIGS. 2 through 6 show different articles, including mirror frame, cosmetics shelf, clock holder, picture frame, and door panel, on which the supporting rod assembly of the present invention is used to provide a luminous decorating effect for the articles.

Figure 7:
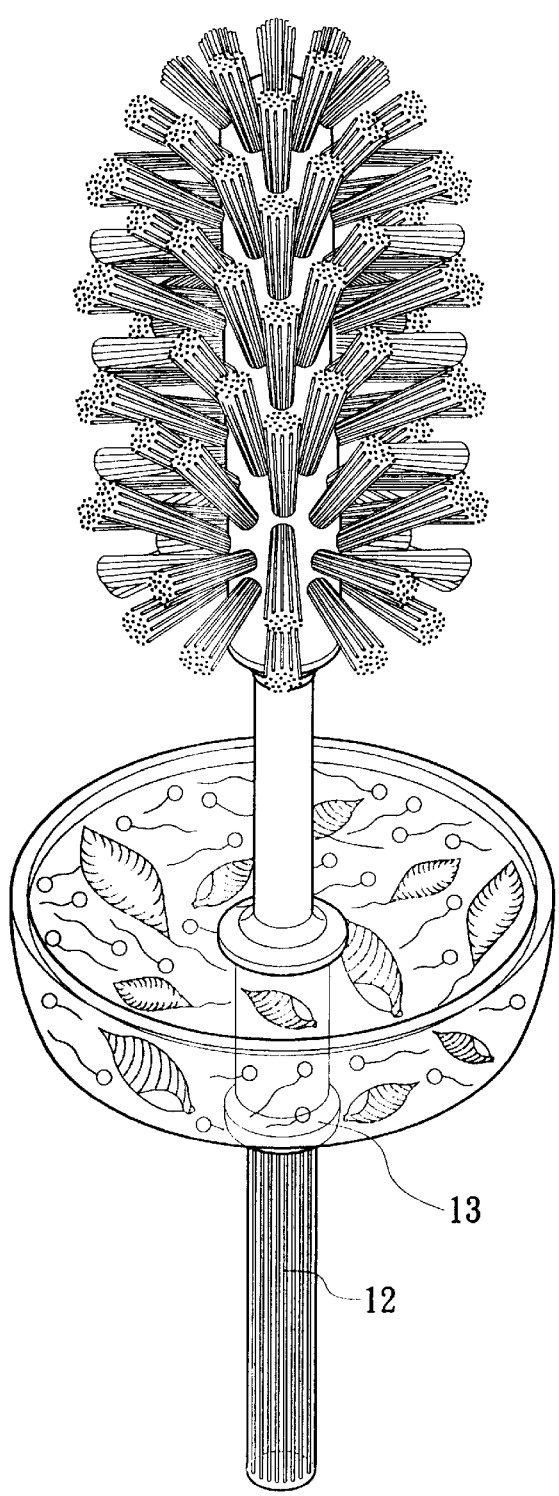
FIG. 7 is a perspective view of a brush using the supporting rod assembly of the present invention as a grip thereof.
Figure 7A:
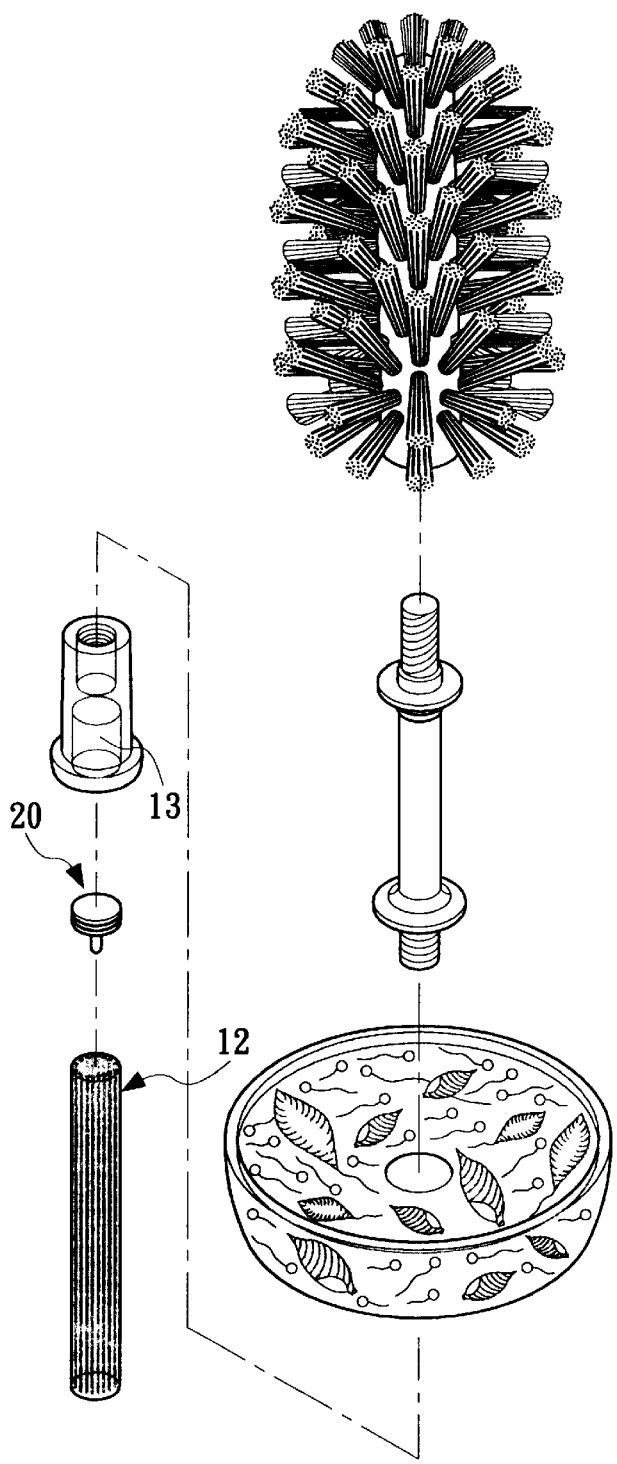
FIG. 7A is an exploded perspective view of FIG. 7.
Figure 7B:
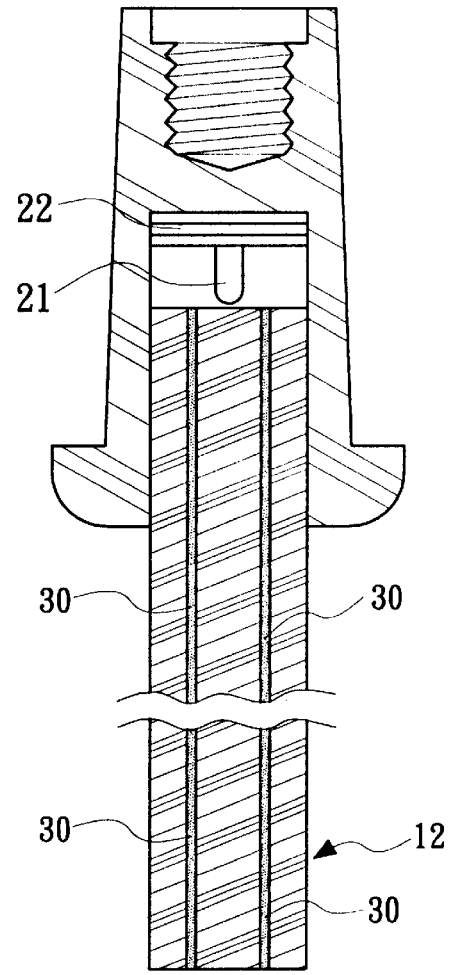
FIG. 7B is a fragmentary vertical sectional view of the grip of the brush of FIG. 7.
Figure 7C:
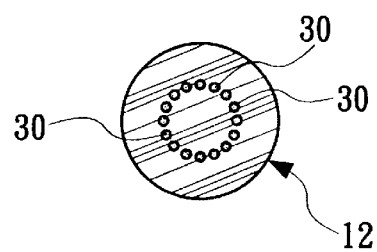
FIG. 7C is a cross sectional view of the grip of the brush of FIG. 7.

FIGS. 7 and 7A are assembled and exploded perspective views, respectively, of a brush using the supporting rod assembly of the present invention as a grip 12 thereof. In the grip 12, a plurality of axially extended light-conducting strips 30 are embedded when the grip 12 is injection molded, as shown in FIG. 7C. Again, a receiving head 13 having a light-emitting device 20 set therein is connected to an inner end of the grip 12. FIG. 7B is a vertical sectional view of the grip 12 and the receiving head 13 in an assembled state. The light-emitting device 20 includes at least one light-emitting diode 21 and a circuit and switch assembly 22. When light emitted from the at least one light-emitting diode 21 is projected onto the inner end of the grip 12 connected to the receiving head 13, it is transmitted through the light-conducting strips 30 to provide a luminous decorating effect for the grip 12.

What is claimed is:

1. A supporting rod assembly providing luminous decorating effect, comprising a supporting rod and two receiving heads;

said supporting rod being made of a transparent plastic material through integral injection molding, and having a row of axially arranged air bubbles formed therein at the time said supporting rod is injection-molded; and said two receiving heads being separately connected to two outer ends of said supporting rod, and at least one of said two receiving heads having a light-emitting device received therein; said light-emitting device including at least one light-emitting diode (LED), from which light is emitted to project onto said outer end of said supporting rod and thereby produces luminous sports or luminous surfaces on outer surfaces of said air bubbles formed in said supporting rod, creating a luminous decorating effect for said supporting rod assembly.

2. The supporting rod assembly providing luminous decorating effect as claimed in claim 1, wherein distances between two said air bubbles adjacent to each other may be differently designed.

3. The supporting rod assembly providing luminous decorating effect as claimed in claim 1, wherein both of said two receiving heads have one said light-emitting device received therein.

4. The supporting rod assembly providing luminous decorating effect as claimed in claim 1, wherein said supporting rod has a plurality of axially extended light-conducting strips embedded therein when said supporting rod is injection-molded, and light emitted from said light-emitting device and projected onto said outer end of said supporting rod being transmitted through said light-conducting strips to provide a luminous decorating effect for said supporting rod assembly.

* * * * *